United States Patent

[11] 3,615,231

| [72] | Inventor | John T. Cullom |
| | | 628 6th Ave., San Manuel, Ariz. 85631 |
| [21] | Appl. No. | 834,355 |
| [22] | Filed | June 18, 1969 |
| [45] | Patented | Oct. 26, 1971 |

[54] PROCESS UTILIZING THE SENSIBLE HEAT OF SMELTER GASES TO RECOVER SULFUR THEREFROM
8 Claims, 1 Drawing Fig.

[52] U.S. Cl. ..................................................... 23/226, 23/212, 23/227
[51] Int. Cl. ............................................................ C01b 17/06
[50] Field of Search............................................. 23/225, 226, 181, 210, 212

[56] References Cited
UNITED STATES PATENTS

| 1,799,452 | 4/1931 | Beekley | 23/210 |
| 1,917,685 | 7/1933 | Bacon | 23/226 |
| 1,959,151 | 5/1934 | Beekley | 23/212 |
| 2,425,754 | 8/1947 | Murphree et al. | 23/210 |
| 3,476,513 | 11/1969 | Welty, Jr. et al. | 23/225 |
| 3,495,941 | 2/1970 | Van Helden | 23/226 |
| 3,515,514 | 6/1970 | Holmes et al. | 23/212 |

*Primary Examiner*—Oscar R. Vertiz
*Assistant Examiner*—G. O. Peters
*Attorney*—Pennie, Edmonds, Morton, Taylor and Adams ABSTRACT: The sensible heat of sulfur dioxide-containing flue gas is utilized to generate steam and to preheat methane or an equivalent hydrocarbon, the steam and hot methane being catalytically reformed to produce hydrogen. The hydrogen thus produced is employed to reduce the sulfur dioxide content of the flue gas to hydrogen sulfide, the hydrogen sulfide being reacted with a further quantity of sulfur dioxide to produce elemental sulfur which is recovered.

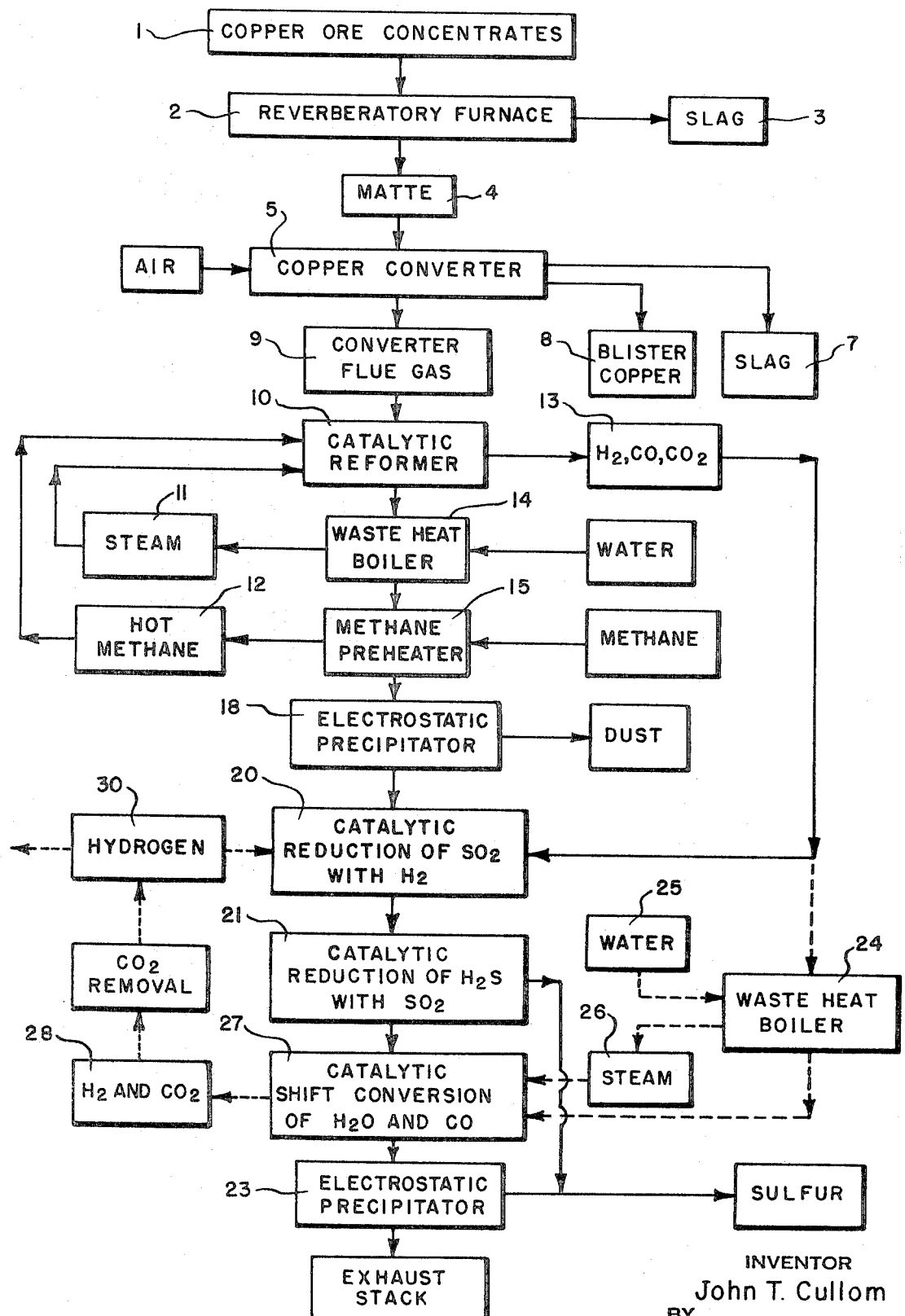

PROCESS UTILIZING THE SENSIBLE HEAT OF SMELTER GASES TO RECOVER SULFUR THEREFROM

BACKGROUND OF THE INVENTION

1. Field of the Invention

This invention relates to the removal of sulfur dioxide from a sulfur dioxide-containing flue gas by the reaction of hydrogen therewith, and it further relates to the production of hydrogen by the catalytic reformation of steam and hydrocarbon.

2. Prior Art

Many pyrometallurgical processes produce large quantities of hot flue gases containing a relatively high percentage of sulfur dioxide. For example, converter gases generated by a copper converter in a conventional copper-smelting operation may leave the converter at a temperature of from 1,200 to 1,600° F. and may contain up to 10 percent sulfur dioxide. These hot flue gases contain a large amount of sensible heat which, if not recovered, represents a serious economic loss. Moreover, the sulfur dioxide content of the flue gases can cause a serious air pollution problem if allowed to escape into the atmosphere. Therefore, it is desirable to recover the waste heat of, and it is necessary to remove sulfur dioxide from, pyrometallurgical flue gases before these gases are discharged into the atmosphere.

It has heretofore been proposed that the sensible heat of such hot pyrometallurgical flue gases be recovered by passing the gas through a waste heat boiler in which steam is generated for general plant service use at the smelter. The flue gas somewhat reduced in temperature is then treated to remove the sulfur dioxide content thereof. The usual procedure for removing sulfur dioxide from smelter flue gases involves converting the sulfur dioxide content of the gas to sulfuric acid in a contact process acid plant. The cool, sulfur dioxide-free gas is then discharged to the atmosphere.

The contact process for manufacturing sulfuric acid is most efficient when the sulfur dioxide content of the gas stream is relatively high and relatively uniform. However, many smelter flue gases, and in particular copper converter gas, do not have a uniform sulfur dioxide content, the sulfur dioxide fluctuating from zero to a maximum and back to zero according to the stage of converter blowing of the cyclic copper conversion process. The cyclic nature of the copper converting process also drastically effects the quantity of converter gas available for the generation of steam in the waste heat boiler which in turn can cause variations in the supply of plant service steam available at the smelter.

After an intensive investigation into the problems involved in the recovery of the waste heat of converter gases and into the related but seemingly separate problems involved in the removal of sulfur dioxide from these converter gases, I have devised a new process which utilizes the waste heat of converter gases to manufacture hydrogen by the catalytic reformation of steam and a suitable hydrocarbon, the hydrogen then being used to convert the sulfur dioxide content of the smelter flue gas to elemental sulfur in the manner hereinafter more fully described.

SUMMARY OF THE INVENTION

As noted, my new process for recovering sulfur from sulfur dioxide-containing smelter flue gases achieves two important objectives. The process utilizes the sensible heat of the flue gases to supply the thermal energy required by the process and it removes sulfur dioxide from the flue gas to alleviate the air pollution problem that otherwise would be created when the flue gases are discharged into the atmosphere. Specifically, the sensible heat of the hot flue gas is utilized to generate steam and heat a hydrocarbon gas, the resulting steam and hot hydrocarbon gas being catalytically reformed to produce hydrogen. The hydrogen thus obtained is reacted with sulfur dioxide contained in the flue gas to produce hydrogen sulfide, the hydrogen sulfide then being reacted with an additional quantity of sulfur dioxide to produce elemental sulfur. The sulfur is recovered and the sulfur dioxide-free flue gas is then discharged to the atmosphere.

In the preferred embodiment of the process hot sulfur dioxide-containing smelter gas is brought into heat exchange relationship with water and with an aliphatic hydrocarbon gas to generate steam and to heat said hydrocarbon gas. The steam and the hot hydrocarbon gas are reacted in the presence of a catalyst (advantageously a nickel catalyst) to produce a hot catalytic reformer gas containing hydrogen, carbon monoxide and carbon dioxide, the thermal energy required to promote the catalytic reformation reaction being supplied by the sensible heat of the hot smelter gas. The hydrogen content of the hot reformer gas is reacted with sulfur dioxide contained in the flue gas in the presence of a suitable catalyst (advantageously a cobalt molybdate or an iron sulfide catalyst) to produce hydrogen sulfide gas. The hydrogen sulfide content of the flue gas is reacted with an additional quantity of sulfur dioxide in the presence of suitable catalyst (advantageously an activated alumina catalyst) to produce elemental sulfur. The elemental sulfur is recovered for subsequent use and the cool, sulfur dioxide-free flue gas is discharged to the atmosphere.

BRIEF DESCRIPTION OF THE DRAWING

My new process will be better understood from the following description thereof in conjunction with the accompanying drawing which comprises a flow sheet of an advantageous embodiment of the process of the invention.

DETAILED DESCRIPTION

The hot flue gases generated by pyrometallurgical processes contain a large quantity of sensible heat and, usually, an unacceptably high proportion of sulfurous gases. In the process of the invention the hot, sulfur dioxide-containing flue gases are directed through a series of heat exchangers (e.g., a waste heat boiler) and catalytic reactors in order, first, to manufacture hydrogen by the catalytic reformation of steam and a hydrocarbon gas and then to reduce the sulfur dioxide content of the flue gas to elemental sulfur by reaction with the aforesaid hydrogen and with hydrogen sulfide. The thermal energy required for the catalytic reformation reaction and the subsequent sulfur dioxide reduction reactions is supplied wholly or for the most part by the sensible heat of the flue gases, each successive heat exchange operation of catalytic reaction being carried out at a lower temperature than its predecessor until most of the available thermal energy (i.e., sensible heat) of the flue gas has been utilized in the process.

The chemistry and operating parameters of the catalytic steam-hydrocarbon reformation reaction are well known. However, the utilization of the sensible heat of smelter flue gases to supply the thermal energy requirements of the reaction is believed to be the hitherto unknown. In the known catalytic reformation process hydrocarbons, such as methane and up to and including heptane and octane, are reacted with steam over a suitable catalyst (usually a nickel oxide catalyst) at 1,200 to 1,800° F. to produce a catalytic reformer gas comprising principally hydrogen but also containing substantial amounts of carbon dioxide and carbon monoxide in accordance with the following representative reaction: (1) $3H_2O + 2aCH_4 \rightleftharpoons 7H_2 + CO + CO_2$ In the process of the invention hot smelter gases at a temperature of about 1,200 to 1,700° F. are brought into heat exchange relationship with tubes containing the nickel catalyst through which tubes the reaction mixture of steam and hot hydrocarbon gas is caused to flow. The hot flue gas somewhat reduced in temperature (for example, at about 1,100 to 1,400° F.) is then brought into heat exchange relationship with water and the hydrocarbon feed gas to generate steam and preheat the hydrocarbon gas to a temperature of about 450 to 500° F. In this connection it should be noted that the efficiency of the nickel catalyst is adversely affected by the presence of unsaturated hydrocarbons and of sulfur in the hydrocarbon feed gas. Accordingly, the hydrocarbon feed gas advantageously comprises a saturated aliphatic compound containing from one to eight carbon atoms and less than 10 p.p.m. of sulfur The catalytic reformer gas contains hydrogen, carbon dioxide and carbon monoxide. The hydrogen content of the reformer gas is employed to effect reduction of the sulfur dioxide content of the flue gas in accordance with the reaction:

(2)   $3H_2 + SO_2 \rightleftharpoons H_2S + 2H_2O$

In the preferred practice of the invention the hot hydrogen-containing reformer gas is mixed with the hot sulfur dioxide containing flue gas to form a sulfur dioxide reduction reaction mixture that is passed over a suitable catalyst that promotes the foregoing reaction. A number of catalysts for this reaction are known each of which is most effective in a specific temperature range. For example, the reduction reaction is efficiently promoted by a cobalt molybdate type catalyst at a reaction temperature of about 700°F. and by an iron sulfide catalyst at a temperature of about 600° F. The flue gas should contain substantially no free oxygen which will react with the catalysts. However, as noted, the reformer gas contains carbon monoxide which will react preferentially with any oxygen present in the flue gas, thus avoiding degrading of the catalyst. The flue gas should also be free of dust which will impair the efficiency of the catalyst. Accordingly, the flue gas is advantageously passed through an electrostatic precipitator to remove dust therefrom prior to the sulfur dioxide reduction reaction.

In an alternate embodiment of my process, both carbon moxoxide and carbon dioxide are removed from the reformer gas prior to the sulfur dioxide reduction reaction. In this embodiment the carbon monoxide content of the reformer gas is removed by the conventional shift conversion reaction in which a catalyst is employed to promote the conversion of steam and carbon monoxide into hydrogen and carbon dioxide in accordance with the reaction:

(3)   $H_2O + CO \rightleftharpoons H_2 + CO_2$

The steam-carbon monoxide shift conversion reaction is promoted by a number of catalysts each of which is most efficient at a specific temperature range. For example, the shift conversion reaction proceeds to substantial completion when carried out in the presence of an iron oxide and chromium oxide catalyst at a reaction temperature of about 700° F. or in the presence of a catalyst containing copper, chromium, and zinc oxides at a temperature of about 350 to 400° F. Other catalysts for this reaction are known to those skilled in the art. In the present embodiment of the invention the sensible heat of the catalytic reformer gas is utilized to generate steam for the shift conversion reaction by bringing the hot reformer gas into heat exchange relationship with water, and the sensible heat of the smelter flue gas is utilized to promote the shift conversion reaction by bringing the flue gas into heat exchange relationship with tubes containing the conversion reaction catalyst.

The shift conversion gas comprises essentially hydrogen and carbon dioxide. The carbon dioxide content of the gas may be removed by conventional means. For example, the shift converter gas may be passed through a bed of lime. The resulting carbon dioxide-free hydrogen is them employed in the catalytic reduction of the sulfur dioxide content of the flue gas in the manner previously described.

The flue gas from the sulfur dioxide reduction step of the process contains a substantial quantity of hydrogen sulfide. The hydrogen sulfide content of the flue gas is reacted with a further quantity of sulfur dioxide in the presence of a suitable catalyst to produce elemental sulfur in accordance with the following reaction:

(4)   $2H_2S = SO_2 \rightleftharpoons 3S = 2H_2O$

The hydrogen sulfide-sulfur dioxide reaction is promoted by a number of catalysts known to those skilled in the art. FOr example, the reaction will proceed to substantial completion in the presence of an activated alumina catalyst at a reaction temperature of about 400° F. The thermal energy required to promote this reaction is largely, if not completely, supplied by the sensible heat of the smelter flue gas. The elemental sulfur product collects in the well of the catalytic reactor chamber in the form of a molten body of sulfur which is withdrawn from time to time from the reaction chamber. Residual droplets of molten sulfur entrained in the flue gas stream are removed therefrom by passing the flue gas through an electrostatic precipitator. The flue gas now at a temperature of below 400° F. and substantially free of sulfur dioxide may now be safely discharged to the atmosphere.

In the following example of the practice of the invention, my new process will be described in connection with the treatment of converter flue gases produced in the course of the converter-blowing operation of a conventional copper-smelting process.

As shown in the accompanying flow sheet, copper ore concentrates 1 are smelted in a reverberatory furnace 2 to produce a slag 3 and an iron and copper containing matte 4. The molten matte is transfered to a converter 5 where the matte is blown with air or oxygen-enriched air to produce a slag 7 and blister copper 8. Two 30-ton ladles of matte and two boats of secondaries are charged to a copper converter 30 feet long and 13 feet in diameter. The charge is fluxed, blown and skimmed and an additional two ladles of matte are added and blown in the same way. Then, copper and anode scraps are added in the copper-blowing stage to make up a charge of approximately 100 tons of blister copper.

Air volume to the converter averages about 27,000 cubic feet per minute (c.f.m.) to produce a corresponding volume of flue gas containing an average of 6 to 8% $SO_2$ at a temperature of about 1,350° F. The hot flue gases are brought into heat exchange relationship with the tubes of a catalytic reformer unit 10 which consists of an array of vertical tubes of high-temperature stainless steel arranged in parallel in the hottest part of the converter gas uptake The reformer unit tubes contain a nickel catalyst which converts the steam 11 and methane 12 flowing through the tubes to reformer gas 13 containing about 80 percent hydrogen and the remainder mainly carbon monoxide and carbon dioxide. The hot flue gas only slightly reduced in temperature is then brought into heat exchange relationship with the tubes of a waste heat boiler 14 and methane preheater 15. The sensible heat of the flue gas will produce approximately 30,000 pounds of steam per hour at a pressure of 540 p.s.i. and at a temperature of 485° F. The steam 11 and the hot methane 12 are then delivered to the catalytic reformer unit 10 where the steam and the methane are converted into about 30,000 cubic feet per hour (c.f.hr.) of reformer gas containing about 24,000 c.f.hr. of hydrogen.

The converter flue gas at a temperature of about 700° F. is passed through an electrostatic precipitator 18 to remove dust therefrom, and the gas now at a temperature of about 600° is reacted with the hydrogen content of the catalytic reformer gas 13 in a catalytic reactor 20. The converter 5 produces about 100 tons of sulfur dioxide per hour. This quantity of sulfur dioxide requires about 220,000 c.f.hr. of hydrogen to be catalytically reduced to hydrogen sulfide in the presence of an iron sulfide catalyst. The carbon monoxide content of the reformer gas reacts with any free oxygen present in the flue gas to form carbon dioxide. Thereby avoiding undesirable oxidation of the catalyst. The flue gas now containing hydrogen sulfide is introduced into a catalytic reactor 21 at a temperature of about 400 ° F. where the hydrogen sulfide is reacted with a further quantity of sulfur dioxide to form elemental sulfur The catalyst employed to promote this reaction is advantageously activated alumina. The molten sulfur produced in the reactor 21 collects in the well of the reactor chamber from which it is withdrawn for subsequent use. The flue gas is passed through an electrostatic precipitator 23 to remove droplets of entrained sulfur from the gas, and the sulfur-free gas is then exhausted to the atmosphere.

In an alternative embodiment of the process, all or part of the reformer gas 13 is brought into heat exchange relationship with the tubes of a waste heat boiler 24 which converts water 25 to steam 26. The steam and reformer gas are then reacted in the presence of a suitable catalyst contained in the tubes of a shift converter unit 27 to convert the steam and carbon monoxide content of the reformer gas to shift converter gas 28 comprising essentially hydrogen and carbon dioxide. The thermal energy required to sustain this reaction is advantageously supplied by the sensible heat of the flue gas which is brought into heat exchange relationship with the catalyst-containing tubes of the catalytic shift converter unit 27. After removal of the carbon dioxide content of the shift converter gas, the hydrogen 30 remaining in the gas is employed for the catalytic reduction of sulfur dioxide in the reactor 20, or for other purposes at the smelter.

I claim:

1. In a process for the removal of sulfur dioxide from hot, sulfur dioxide-containing smelter flue gases by the catalytic reduction of said sulfur dioxide to sulfur, the improvement which comprises passing the hot flue gas in indirect heat exchange relationship with a mixture of steam and hot hydrocarbon gas in the presence of a catalytic reformer catalyst to produce a hot catalytic reformer gas containing hydrogen, carbon monoxide and carbon dioxide, passing said hot flue gas in indirect heat exchange relationship with water and a hydrocarbon gas to generate steam and to heat said hydrocarbon gas, said steam and hot hydrocarbon gas being employed as the feed for the preceding catalytic reformation step of the process, reacting the hydrogen contained in the hot reformer gas with about two-thirds of the sulfur dioxide contained in the flue gas in the presence of a catalyst to produce an equivalent quantity of hydrogen sulfide gas, reacting said hydrogen sulfide with the remainder of the sulfur dioxide content of the flue gas in the presence of a catalyst to produce elemental sulfur and flue gas substantially free of sulfur dioxide, and recovering said sulfur 2. The process according to claim 1 in which the catalytic reformation of steam and hydrocarbon gas is carried out at a higher temperature than the temperature at which said steam is generated and at which said hydrocarbon gas is initially heated.

3. The process according to claim 1 in which the hydrocarbon gas comprises essentially one or more saturated aliphatic compounds containing from one to eight carbon atoms.

4. The process according to claim 1 in which the catalytic reformation reaction is carried out at a temperature of about 1,200 to 1,700° F. in the presence of a nickel catalyst.

5. The process according to claim 1 in which the sensible heat of flue gas at an initial temperature of about 1,100 to 1,400° F. is utilized to generate steam and to preheat the hydrocarbon gas.

6. The process according to claim 1 in which the sulfur dioxide content of the flue gas is reacted with hydrogen at a temperature of about 600 to 700° F. in the presence of a iron sulfide or a cobalt molybdate catalyst to produce hydrogen sulfide.

7. The process according to claim 1 in which the sulfur dioxide content is reacted with sulfur dioxide at a temperature of about 400° F. in the presence of an alumina catalyst to produce elemental sulfur.

8. The process according to claim 1 in which the hot reformer gas is brought into heat exchange relationship with water to generate steam, in which said steam and the carbon monoxide content of said reformer gas are reacted in the presence of a catalyst to produce a shift converter gas containing hydrogen and carbon dioxide, and in which said carbon dioxide is removed from said shift converter gas to produce hydrogen essentially free of carbon monoxide and carbon dioxide.

PO-1050
(5/69)

UNITED STATES PATENT OFFICE
CERTIFICATE OF CORRECTION

Patent No. 3,615,231             Dated     October 26, 1971

Inventor(s) ~~John T. Cullom~~

It is certified that error appears in the above-identified patent and that said Letters Patent are hereby corrected as shown below:

Column 2, line 14, "suitablKe" should read -- suitable --
Column 2, line 62, "$3H_2O+2aCH_4$" should read -- (1) $3H_2O+2CH4$ --

Column 3, line 10 "hoT" should read -- hot --
Column 3, line 60 "them" should read -- then --
Column 3, line 69 "(4) $2H_2S=SO_2 \rightarrow 3S=2H_2O$" should read --
         -- (4) $2H_2S+SO_2 \rightarrow 3S+2H_2O$ --
Column 3, line 71 "fOr" should read -- For --

Column 4, line 17 "copper containing" should read
         -- copper sulfide-containing --
Column 4, line 47 "30,000 cubic feet" should read
         -- 300,000 cubic feet--
Column 4, line 48 "24,000 cfh" should read -- 240,000 cfh
Column 4, line 54 "100 tons" should read -- 10 tons --

Column 6 lines 22 and 23" sulfur dioxide content" should read
-- hydrogen sulfide --

Signed and sealed this 9th day of May 1972.

SEAL)
ttest:

DWARD M. FLETCHER, JR.          ROBERT GOTTSCHALK
ttesting Officer                   Commissioner of Patents